United States Patent [19]

Le Masson et al.

[11] Patent Number: 5,171,509
[45] Date of Patent: Dec. 15, 1992

[54] PROCESS FOR ASSEMBLING A SKI BY DUPLICATE MOLDING AND SKI OBTAINED BY USE OF THIS PROCESS

[75] Inventors: Jacques Le Masson, Annecy; Dominique Vuarier, Annecy Le Vieux, both of France

[73] Assignee: Salomon S. A., Chavanod, France

[21] Appl. No.: 656,008

[22] Filed: Feb. 15, 1991

[30] Foreign Application Priority Data

Feb. 15, 1990 [FR] France .................. 90 02070

[51] Int. Cl.⁵ .................. B29C 43/02; B29C 43/12; B29C 43/30
[52] U.S. Cl. .................. 280/610; 156/85; 156/245; 264/258; 264/229; 264/230; 264/257
[58] Field of Search .................. 264/230, 271.1, 279.1, 264/275, 257, 258, 259, 229, 230, 257; 156/85, 86, 245; 280/610; 180/180, 182; 441/68

[56] References Cited

U.S. PATENT DOCUMENTS

| | | | |
|---|---|---|---|
| 3,201,138 | 8/1965 | Brown .................. | 280/610 |
| 3,635,482 | 1/1972 | Holman .................. | 280/11.13 L |
| 3,734,519 | 5/1973 | Bennett .................. | 280/610 |
| 3,967,992 | 7/1976 | McCaskey et al. .................. | 156/85 |
| 4,235,832 | 11/1980 | Leighton .................. | 264/230 |
| 4,512,835 | 4/1985 | Gardiner .................. | 264/258 |
| 4,725,070 | 2/1988 | Maruyama .................. | 280/610 |
| 4,943,030 | 7/1990 | Fischer .................. | 249/121 |

FOREIGN PATENT DOCUMENTS

| | | |
|---|---|---|
| 87112272 | 12/1987 | Fed. Rep. of Germany . |
| 0081834 | 12/1982 | France . |
| 2589073 | 10/1986 | France . |

OTHER PUBLICATIONS

Roberts, Organic Coatings, Govt. Printing Office Washington, D.C. (1968) pp. 58-60 Relied on.

*Primary Examiner*—Willard Hoag
*Attorney, Agent, or Firm*—Pollock, Vande Sande & Priddy

[57] ABSTRACT

Assembly of the ski is effected in one preliminary step in which a mechanical resistance sub-assembly is produced, followed by a single molding step. During the preliminary step, at least one lower reinforcement piece (1), a core (2), and an upper reinforcement piece (3) are stacked together, said stacked assembly is inserted in a heat retractable casing (4), and the casing is heated to shrink it retracted. During the single molding step, the lower elements of the ski structure (11, 12, 13) are placed in the mold, the mechanical resistance sub-assembly is placed on the lower elements of the ski structure, the mold is closed, and a thermohardenable polymer is injected so as to form the protective covering (15) of the ski.

18 Claims, 2 Drawing Sheets

PROCESS FOR ASSEMBLING A SKI BY DUPLICATE MOLDING AND SKI OBTAINED BY USE OF THIS PROCESS

BACKGROUND OF THE INVENTION

Present-day skis generally have a composite structure in which different materials are combined in such a way that each of them comes optimally into play, given the distribution of the mechanical stresses. Thus, the structure generally comprises peripheral protective elements forming the upper and lateral surfaces of the ski and internal resistance elements, or strips, made of a material having great mechanical strength and rigidity. The structure also comprises filling elements such as a central core embodying a cellular structure, a sliding sole plate which forms the lower surface of the ski and allows the ski to slide properly on the snow, and lower metal squares forming the lower ribs of the ski.

To obtain the appropriate physical characteristics, the manufacture of modern skis thus requires the assembly of a relatively large number of elements made of different materials, which must be bonded or welded to each other to produce the final ski structure.

In injection techniques used for ski manufacture, one of the major difficulties lies in the positioning and position maintenance of the ski components in the mold before injection.

Techniques have been proposed to form several sub-assemblies before molding, each of which is obtained by joining several elements together. However, these techniques increase the number of successive operations.

In addition, in conventional techniques, it appears difficult to produce external ski surfaces whose dimensions are very precise.

SUMMARY OF THE INVENTION

The present invention is intended, in particular, to avoid the difficulties posed by conventional processes, by proposing a particularly economical assembly process in which assembly may be effected in a single molding step.

The process according to the invention makes it possible to obtain proper bonding of the various elements, and in particular effective bonding of the mechanical reinforcement elements.

The process according to the invention also makes it possible to obtain a ski whose external shape is produced with a high degree of dimensional precision, the external surface of the ski being obtainable directly by molding and its surface finish being determined directly by the mold.

To achieve these objects, among others, the process of assembling a ski according to the invention is such that:

a) during a preliminary step, a mechanical resistance sub-assembly is produced by:
  stacking at least one lower reinforcement piece, a core, and an upper reinforcement piece;
  inserting said stacking arrangement in a retractable jacket made of a material possessing strength of adhesion with the elements designed to come into contact with this jacket within the ski structure; and
  retracting the jacket;

b) during a single molding operation, the components of the ski are assembled in a two-part mold:
  the lower elements of the ski structure comprising, in particular, the lower squares and the sliding sole plate are laid down;
  the mechanical resistance sub-assembly is placed on the lower elements of the ski structure;
  the mold is closed; and
  a thermohardenable polymer is injected so as to form the protective covering of the ski around the mechanical resistance sub-assembly.

After injection, an operation involving the heating of the assembly is carried out, thus allowing the polymerization of the thermohardenable polymer. Next, the assembly is cooled to a temperature below the vitreous transition temperature of the protective covering.

The temperature-rise operation may be effected, in particular, by raising the temperature resulting from the exothermic polymerization reaction of the thermohardenable polymer. If this temperature rise is not sufficient, calorific energy may also be externally supplied.

In the preliminary stacking operation, at least one of the upper and lower strengthening pieces advantageously comprises a fabric preliminarily impregnated with a thermohardenable resin which is not entirely reticulate, or an element made of a thermohardenable material reinforced with fibers, which are preferably continuous.

The process lends itself, however, to the inclusion of metal mechanical reinforcements which may be associated with films ensuring adhesion with other materials in the ski structure.

BRIEF DESCRIPTION OF THE DRAWINGS

Other objectives, features and advantages of the present invention will emerge from the following description of specific embodiments provided with reference to the attached drawings, in which.

DESCRIPTION OF THE PREFERRED EMBODIMENT

Figure 1:
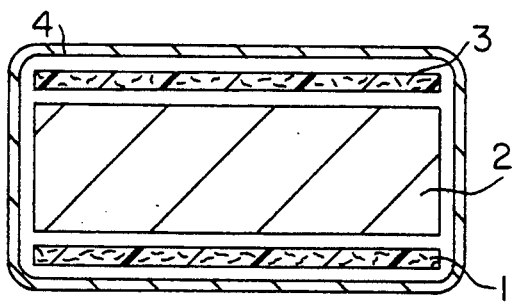
FIG. 1 is a transverse cross-section of the first phase of the preliminary operation for the production of a mechanical resistance sub-assembly according to the invention.

In the embodiment shown in FIG. 1, a stack of at least one lower reinforcement piece 1, a central core 2, and an upper reinforcement piece 3 is first produced. This stack formed by the core 2 and the two reinforcement pieces 1 and 3 is inserted in a retractable casing 4.

Figure 2:
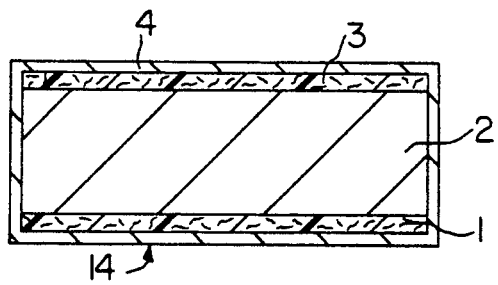
FIG. 2 illustrates the second phase of the formation of the mechanical resistance sub-assembly, during the preliminary phase.

In FIG. 2, by retracting the jacket, a mechanically resistant sub-assembly is formed, the components of the subassembly being held together by the retracted casing. The casing may be retracted, for example, in a conventional manner, by use of a warm air current directed on the casing.

The casing 4 may advantageously be made of a material having sufficient strength of adhesion with the elements which will be in contact with it in the final ski structure. The material constituting the casing must, in particular, have good adhesive properties with the material forming the reinforcement pieces 1 and 3, with the material forming the lower elements of the ski such as the sliding sole plate, and with the material forming the peripheral protective layer of the ski.

Use may advantageously be made of a casing made of thermoplastic polyurethane, of copolyamide, of ABS (acrylonitrile butadiene styrene), or of polyethylene or an ethylene and vinyl acetate copolymer grafted through the action of carboxylic acid, of a carboxylic acid ester or its anhydrous form, or of an ionomer. The casing may have a thickness of several hundredths to several tenths of millimeters, but preferably between 0.5 and 0.3 mm.

Figure 3:
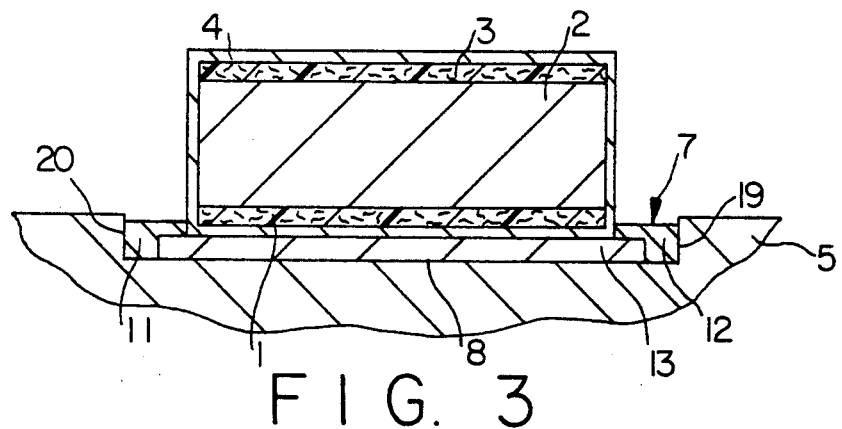
FIG. 3 is a transverse cross-section of the placement of the elements in the mold.
Figure 4:
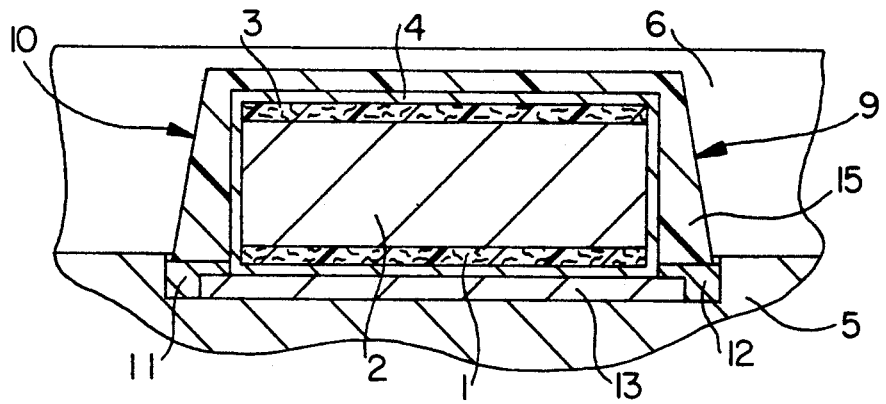
FIG. 4 illustrates the duplicate molding operation.

FIGS. 3 and 4 show that, during a single molding step, the ski components are assembled in a two-part mold, including a lower part 5 and an upper part 6. The lower part 5 of the mold comprises a recess 7 designed to house the lower components of the ski, the recess 7 being open at the top in order to be sealed by the upper part 6 of the mold.

The recess 7 is limited by a flat lower surface 8 whose width corresponds to the width of the lower ski surface, and by two lateral faces 19 and 20 designed to mold the lower parts of the lateral surfaces of the ski. The upper part 6 of the mold comprises an upper wall and two lateral surfaces 9 and 10 designed to form the lateral surfaces of the ski. In the illustrated embodiment, surfaces 9 and 10 are inclined in order to form the inclined lateral surfaces of the ski. Other shapes are possible within the scope of the invention.

The lower elements of the ski, comprising the lower metal edges 11 and 12 and the lower sliding sole plate 13, are positioned in the bottom of the recess 7.

The mechanical resistance sub-assembly previously formed by assembling the core 2, the reinforcement pieces 1 and 3, and the retracted casing 4, is placed on the lower elements 11, 12, and 13 of the ski. The lower face 14 of the mechanical resistance is pressed for support on the upper face of the sole plate 13.

As shown in FIG. 4, the mold is closed by fitting the upper part 6 on the lower part 5, and a thermohardenable polymer is injected through one or several injection ducts (not shown), so as to form the protective ski covering 15 around the mechanical resistance sub-assembly.

The temperature of the assembly is then raised in order to polymerize the thermohardenable polymer. The assembly is cooled below the vitreous transition temperature of the polymer composing the covering 15, and the assembly is unmolded.

The assembly-heating operation carried out during molding is partially carried out by calorific release obtained by the exothermic polymerization reaction of the thermohardenable polymer forming the covering 15. Generally, however, this temperature rise is not sufficient, and is supplemented by an external calorific energy supply, by heating the mold using an external calorific energy source.

The process according to the invention lends itself to the use, during the preliminary stacking step, of roughed-out lower reinforcement piece 1 and/or upper reinforcement piece 3 comprising a fabric pre-impregnated with thermohardenable resin which is not entirely reticulated, and which may be a non-saturated polyester or an epoxy resin.

The process according to the invention also lends itself to the use, during the preliminary stacking step, of roughed-out lower reinforcement piece 1 and/or upper reinforcement piece 3 comprising an element made of a thermoplastic material reinforced with fibers. This thermoplastic material may be a polyamide, a polyester, and polycarbonate, or PEI (polyether imide).

The procedure also lends itself to the use, during the preliminary stacking step, of reinforcement pieces comprising metal elements, possibly associated with peripheral films ensuring adhesion with the other materials in the ski structure.

According to the invention, a ski structure may thus be produced in which the lower and upper reinforcement pieces 1 and 3 are made of a single material or of different materials chosen from among fabrics pre-impregnated with thermohardenable resin, thermoplastic materials reinforced with fibers, preferably continuous fibers, or metals.

Because, during molding, a temperature rise is effected to polymerize the covering 15, this temperature rise may advantageously be used to terminate the polymerization of the material forming the roughed-out lower and/or upper reinforcement pieces 1 and 3, when they are obtained using a thermohardenable resin which is not entirely reticulated. This rise in temperature during molding also promotes the adhesion of the reinforcement pieces 1 and 3, when they are obtained from a thermoplastic material reinforced with fibers or from a metal element associated with films ensuring adhesion.

During the molding operation, means are advantageously provided to hold the mechanical resistance sub-assembly temporarily in position on the lower ski elements, before and after injection of the thermohardenable polymer forming the covering 15.

According to a first embodiment, the position-maintenance means may comprise the lower edges 11 and 12 of the ski, as shown in FIG. 3, between which the mechanical resistance sub-assembly is partially embedded. Edges 11 and 12 ensure lateral adjustment.

Position maintenance may be improved by providing means which promote the adhesion of the lower surface of the mechanical resistance sub-assembly on the upper face of the lower elements of the ski. In particular, self-adhesive surface finishes may be provided.

Figure 5:
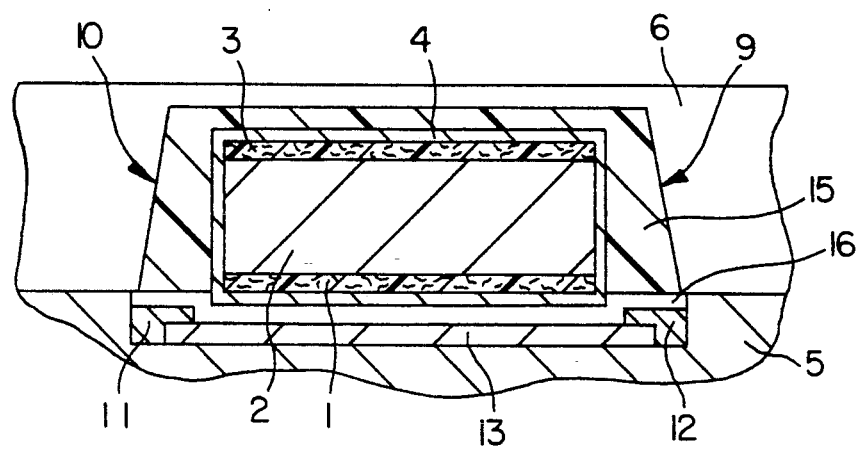
FIG. 5 illustrates the duplicate molding operation according to another embodiment of the invention.

Or, as shown in FIG. 5, an upper reinforcement piece 16 may be added to the lower elements of the ski, this piece being made of a fabric preliminarily impregnated with thermohardenable resin which covers the lower edges 11 and 12, so as to improve the bonding of the protective covering 15 onto the assembly formed by the lower ski components.

In addition, the adhesion of the mechanical resistance sub-assembly on the lower ski components may be promoted by preliminarily raising the temperature of the lower ski components, i.e., by pre-heating the lower part 5 of the mold, before injection.

The adhesion of the mechanical resistance sub-assembly on the lower ski components may also be promoted by pre-heating the lower face 14 of the mechanical resistance sub-assembly, in order to reactivate its adhesive strength just before it is placed in the mold 5.

During the preliminary operation in which the mechanical resistance sub-assembly is formed, the roughed-out lower and upper reinforcement pieces 1 and 3 may be made of impregnated glass fibers, aluminum alloy, steel, carbon, or amorphous metal. Impregnation may be effected using a moist or partially reticulated thermohardenable resin selected from the group consisting of polyesters, epoxies, polyurethanes, and phenolic resins.

As an alternative, impregnation may be effected using a thermoplastic resin selected from the group consisting of polyamides, polycarbonates, PEI's (polyether imide) and thermoplastic polyester.

The covering 15 may be formed by injection of a thermohardenable polyurethane-type elastomer.

The core 2 may comprise parallel lateral faces.

Figure 6:
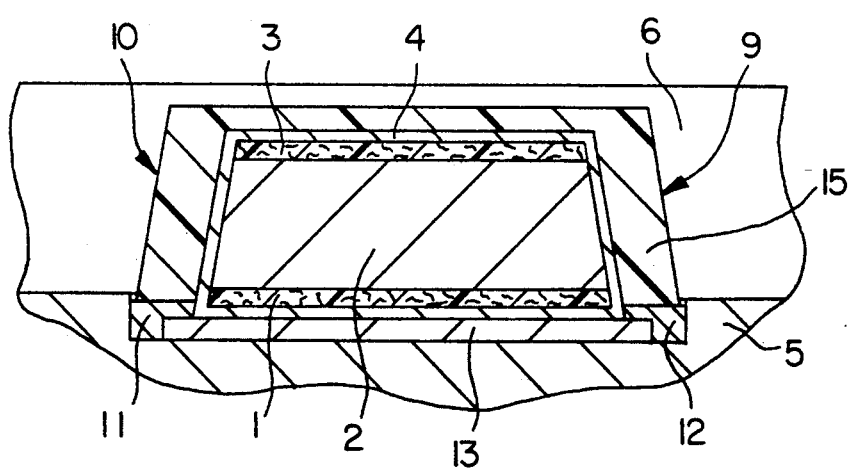
FIG. 6 illustrates the process according to the invention according to an embodiment in which the core has lateral inclined surfaces.

As an alternative, the core 2 may advantageously comprise inclined and/or inwardly curved faces having a shape similar to the generally inclined and/or inwardly-curving lateral faces of an alpine ski, as shown in FIG. 6.

The ski structure obtained by the process according to the invention thus comprises:

a core 2;

an upper reinforcement piece 3 applied to the upper face of the core 2;

a lower reinforcement piece 1 applied to the lower face of the core 2;

a film 4 surrounding the reinforcement pieces and the core;

lower elements such as the lower edges 11 and 12 and the sliding sole plate 13; and an upper protective layer 15 made of a thermohardenable polymer.

What is claimed is:

1. Process for assembling a ski, comprising the steps of:
   (a) during a preliminary step, constructing a mechanical sub-assembly by
     forming a stack comprising at least one lower reinforcement piece (1), a core (2), and an upper reinforcement piece (3);
     inserting said stack in a retractable casing (4) made of a material having strength of adhesion with elements of a ski structure to be in contact with said casing, thereby forming a mechanical resistance sub-assembly; and
     retracting said casing (4);
   (b) during a single molding operation, assembling said ski components in a two-part mold (5, 6) in a single molding operation comprising the steps of:
     positioning lower elements of said ski structure, lower edges (11, 12) and a sliding sole plate (13);
     positioning said mechanical resistance sub-assembly (1, 2, 3, 4) on said lower elements of said ski structure;
     closing said mold (5, 6); and
     injecting a thermohardenable polymer in order to form the protective covering (15) of said ski around said mechanical resistance sub-assembly.

2. Process according to claim 1, including, after injection of said polymer, heating said assembly so as to allow polymerization of said thermohardenable polymer, and then cooling said assembly to a temperature below a vitreous transition temperature of said protective covering (15).

3. Process according to claim 2, wherein said assembly-heating step is effected by supplying external calorific energy.

4. Process according to claim 2, wherein at least one of said lower (1) and upper (3) reinforcement pieces comprises, in said stack produced during said preliminary step, a non-tacky fabric preliminarily impregnated with thermohardenable resin.

5. Process according to claim 4, wherein said thermohardenable resin is one of an unsaturated polyester resin and an epoxy resin.

6. Process according to claim 1, wherein at least one of said lower and upper reinforcement pieces (1, 3) comprises, in said stack produced during said preliminary step, an element made of a fiber-reinforced thermoplastic material.

7. Process according to claim 6, wherein said material is selected from the group consisting of a polyamide, a polyester, a polycarbonate, and a polyether imide.

8. Process according to claim 1, wherein at least one of said lower and upper reinforcement pieces (1, 3) comprises, in said stack produced during said preliminary step, a metal element associated with films ensuring adhesion with other materials of said ski structure.

9. Process according to claim 1, wherein, during said molding operation, position-maintenance means ensure temporary position maintenance of said mechanical resistance sub-assembly (1, 2, 3, 4) on said lower edges (11, 12) and sliding sole plate (13) before and during injection of said thermohardenable polymer (15).

10. Process according to claim 9, wherein said position-maintenance means comprises said lower edges (11, 12) of said ski, between which said mechanical resistance sub-assembly (1-4) is embedded, thus ensuring lateral adjustment.

11. Process according to claim 9, wherein said position-maintenance means comprise a surface finish ensuring adhesion of said lower face (14) of said mechanical resistance sub-assembly to an upper face of said lower edges (11, 12) and said sliding sole plate (13).

12. Process according to claim 11, wherein adhesion of said mechanical resistance sub-assembly (1-4) on said lower edges (11, 12) and said sliding sole plate (13) is promoted by preliminarily raising a temperature of said lower edges (11, 12) and said sliding sole plate (13).

13. Process according to claim 11, wherein adhesion of said mechanical resistance sub-assembly (1-4) on said lower edges (11, 12) and said sliding sole plate (13) is promoted by preliminarily heating said lower face (14) of said mechanical resistance sub-assembly (1-4) so as to reactivate its adhesive strength before being placed in said mold (5, 6).

14. Process according to claim 1, wherein said core (2) comprises parallel lateral surfaces.

15. Process according to claim 1, wherein said core (2) comprises inclined lateral surfaces.

16. Process according to claim 1, comprising an upper reinforcement piece (16) made of a non-tacky fabric pre-impregnated with a thermohardenable resin which covers said lower edges (11, 12).

17. Process according to claim 1, wherein said retractable casing (4) is made of a material selected from the group consisting of thermoplastic polyurethanes, copolyamides, ABS (acrylonitrile butadiene styrene), polyethylenes, and ethylene copolymers grafted through the action of carboxylic acid, carboxylic acid ester or its anhydrous form, and ionomers.

18. Ski produced by duplicate molding and comprising:
   (a) a core (2);
   (b) an upper reinforcement element (3) pressed on an upper face of said core (2);
   (c) a lower reinforcement element (1) pressed on a lower surface of said core (2);
   (d) a heat shrunk film (4) surrounding said reinforcement elements (1, 3) and said core (2);
   (e) lower elements of said ski, said lower elements comprising lower edges (11, 12) and a sliding sole plate (13); and
   (f) an upper protective layer (15) made of a thermohardenable polymer.

* * * * *